(12) United States Patent
Lo

(10) Patent No.: US 9,775,306 B2
(45) Date of Patent: Oct. 3, 2017

(54) ABOVE GROUND SPRINKLER

(71) Applicant: YUAN-MEI CORP., Changhua County (TW)

(72) Inventor: Shun-Nan Lo, Changhua County (TW)

(73) Assignee: YUAN-MEI CORP., Changhua County (TW)

( * ) Notice: Subject to any disclaimer, the term of this patent is extended or adjusted under 35 U.S.C. 154(b) by 182 days.

(21) Appl. No.: 14/685,606

(22) Filed: Apr. 14, 2015

(65) Prior Publication Data

US 2016/0303582 A1    Oct. 20, 2016

(51) Int. Cl.
| | | |
|---|---|---|
| *A62C 11/00* | (2006.01) | |
| *A01G 25/00* | (2006.01) | |
| *B05B 1/16* | (2006.01) | |
| *B05B 1/26* | (2006.01) | |
| *B05B 3/04* | (2006.01) | |

(52) U.S. Cl.
CPC ............. *A01G 25/00* (2013.01); *B05B 1/169* (2013.01); *B05B 1/1645* (2013.01); *B05B 1/267* (2013.01); *B05B 3/0422* (2013.01); *B05B 3/0431* (2013.01)

(58) Field of Classification Search
CPC ....... B05B 15/001; B05B 15/10; B05B 3/044; B05B 15/08; B05B 1/14; A01G 25/00
USPC ................ 239/200–202, 207, 237, 242, 243, 239/288–288.5, 225.1, 240, 263.3
See application file for complete search history.

(56) References Cited

U.S. PATENT DOCUMENTS

| | | |
|---|---|---|
| 1,871,258 A | 8/1932 | Coles et al. |
| 1,919,196 A | 7/1933 | Brooks |
| 2,313,994 A | 3/1943 | Grant |
| 2,726,119 A | 12/1955 | Egly et al. |
| 2,970,774 A | 2/1961 | Li |
| 3,033,467 A | 5/1962 | Hofer |
| 3,038,666 A | 6/1962 | Dudley et al. |
| 3,081,950 A | 3/1963 | Rinkewich |
| 3,094,283 A | 6/1963 | Balister |
| 3,112,883 A | 12/1963 | Blanchard |
| 3,149,784 A | 9/1964 | Skidgel |
| 3,383,047 A | 5/1968 | Hauser |
| 3,464,628 A | 9/1969 | Chow |
| 3,645,451 A | 2/1972 | Hauser |
| 3,655,132 A | 4/1972 | Rosic |
| 3,758,038 A | 9/1973 | Ridgway |
| 3,785,565 A * | 1/1974 | Perry .................... B05B 15/10 239/206 |

(Continued)

*Primary Examiner* — Arthur O Hall
*Assistant Examiner* — Adam J Rogers
(74) *Attorney, Agent, or Firm* — Raymond Y. Chan; David and Raymond Patent Firm

(57) ABSTRACT

An above ground sprinkler is revealed. The ground sprinkler includes a channel controller, a housing with a driving member mounted therein, an adjustment part, a locking plate, a first cover, and a second cover. A tube is extended to form two plates with a retaining groove therebetween. A rib is disposed on an outer side of the plate. The first cover includes a column part with an insertion part while the second cover includes a tongue part. Locking parts are disposed on the insertion part. The insertion part is fitted over the plates while the ribs of the plates are locked with the locking parts. When the second cover is covered over the first cover, the tongue part is mounted into the retaining groove so that the two plates are leaning against and locked by the locking parts tightly, unable to be released.

5 Claims, 6 Drawing Sheets

(56) References Cited

U.S. PATENT DOCUMENTS

| | | | |
|---|---|---|---|
| 3,878,990 A | 4/1975 | Geraudie | |
| 3,915,383 A | 10/1975 | King | |
| 3,921,912 A | 11/1975 | Hayes | |
| 3,934,820 A | 1/1976 | Phaup | |
| D239,174 S | 3/1976 | Raffler | |
| 3,998,390 A | 12/1976 | Peterson | |
| 4,069,976 A | 1/1978 | Chauvigne' | |
| D250,769 S | 1/1979 | Dadson | |
| D254,087 S | 1/1980 | Dadson | |
| 4,201,344 A | 5/1980 | Lichte | |
| 4,235,379 A | 11/1980 | Beamer | |
| 4,253,608 A | 3/1981 | Hunter | |
| 4,303,201 A | 12/1981 | Elkins et al. | |
| 4,335,852 A | 6/1982 | Chow | |
| 4,347,981 A | 9/1982 | Hayes | |
| 4,417,691 A | 11/1983 | Lockwood | |
| 4,471,908 A | 9/1984 | Hunter | |
| D277,777 S | 2/1985 | Lemkin | |
| 4,501,391 A | 2/1985 | Hunter | |
| 4,534,512 A | 8/1985 | Chow et al. | |
| D282,769 S | 2/1986 | Lemkin | |
| 4,597,528 A | 7/1986 | Caruana | |
| 4,613,077 A | 9/1986 | Aronson | |
| 4,624,412 A | 11/1986 | Hunter | |
| 4,625,914 A | 12/1986 | Sexton | |
| RE32,386 E * | 3/1987 | Hunter | B05B 15/10 239/206 |
| 4,708,290 A | 11/1987 | Osmond | |
| D297,042 S | 8/1988 | Evans | |
| D297,255 S | 8/1988 | Henken | |
| 4,760,958 A | 8/1988 | Greenberg | |
| 4,773,595 A * | 9/1988 | Livne | B05B 15/10 239/203 |
| 4,787,558 A | 11/1988 | Sexton et al. | |
| 4,819,875 A | 4/1989 | Beal | |
| 4,867,378 A | 9/1989 | Kah, Jr. | |
| 4,867,379 A | 9/1989 | Hunter | |
| D305,791 S | 1/1990 | Lang | |
| D305,792 S | 1/1990 | Hastings | |
| 4,892,252 A * | 1/1990 | Bruninga | B05B 15/10 239/205 |
| D305,925 S | 2/1990 | Hastings et al. | |
| 4,903,897 A | 2/1990 | Hayes | |
| 4,919,337 A | 4/1990 | Van Leeuwen | |
| D309,772 S | 8/1990 | Hastings et al. | |
| 5,031,833 A * | 7/1991 | Alkalay | B05B 3/0436 239/104 |
| 5,048,757 A | 9/1991 | Van Leeuwen | |
| 5,052,621 A | 10/1991 | Katzer | |
| 5,086,977 A | 2/1992 | Kah, Jr. | |
| 5,098,021 A | 3/1992 | Kah, Jr. | |
| 5,104,045 A | 4/1992 | Kah, Jr. | |
| 5,115,977 A | 5/1992 | Alkalay | |
| 5,141,157 A | 8/1992 | Han et al. | |
| 5,213,016 A | 5/1993 | Kah, Jr. | |
| 5,226,599 A | 7/1993 | Lindermeir et al. | |
| 5,348,228 A | 9/1994 | Wang | |
| D358,449 S | 5/1995 | Ford | |
| 5,423,486 A | 6/1995 | Hunter | |
| 5,526,982 A | 6/1996 | McKenzie | |
| D374,914 S | 10/1996 | Wang | |
| D378,399 S | 3/1997 | Simonetti | |
| 5,611,488 A | 3/1997 | Frolich | |
| 5,746,374 A | 5/1998 | Simonetti et al. | |
| 5,765,757 A | 6/1998 | Bendall | |
| 5,769,322 A | 6/1998 | Smith | |
| 5,826,797 A | 10/1998 | Kah, III | |
| 6,085,995 A | 7/2000 | Kah, Jr. et al. | |
| 6,138,924 A | 10/2000 | Hunter | |
| 6,182,909 B1 | 2/2001 | Kah, Jr. et al. | |
| 6,237,862 B1 | 5/2001 | Kah, III et al. | |
| 6,601,781 B2 | 8/2003 | Kah, III et al. | |
| 6,869,026 B2 * | 3/2005 | McKenzie | B05B 1/304 239/206 |

\* cited by examiner

ABOVE GROUND SPRINKLER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a sprinkler used in an irrigation system, especially to an above ground sprinkler with adjustable spray patterns.

Description of Related Arts

Generally, there are various irrigation systems available now. An above-ground sprinkler is one of the irrigation systems that provide flexible irrigation modes. For example, the above-ground sprinkler is connected to a garden hose and set at a specific zone that requires irrigation. Moreover, the above-ground sprinkler can be used for providing additional water at the area without sufficient water, worked as a supplement water source. Or the above-ground sprinkler can be used as a main water source at specific zones and can be moved to the specific positions that require irrigation.

Referring to U.S. Pat. No. 7,090,146, an above-ground adjustable spray pattern sprinkler is revealed. An above-ground sprinkler includes a head that rotates about an angle determined by a pair of arc adjustment rings. Rotation of the head is driven by a drive mechanism with a rotor rotationally driven by fluid flowing to the head. The drive mechanism includes a valve disposable in two positions for control of the direction in which the rotor rotates. A reduction gear drive transmits torque from the rotor to the head to cause the head to rotate. The head includes a cover with an outlet aperture and a flow control member that rotates within the cover to dispose any of a plurality of nozzles in alignment with the outlet aperture. A deflection screw or a slider with a plurality of deflectors may be used to provide variable deflection of water sprayed from the outlet aperture.

The cover also has a shaft extending through the central opening of the plate of the flow control member. The shaft has a bore that is threaded to receive the attachment screw. The interior shelf of the opening of the cap may be aligned flush with the end of the flow control member when the head is assembled so that installation of the attachment screw tends to keep the cap and the flow control member in place, with respect to the cover.

Additionally, the cover has a detent mechanism positioned on the plate. The detent mechanism may take the form of a ball-and-spring detent. The plate may have a plurality of indentations and/or ridges (not shown) aligned with the extension tubes so that the ball is able to slide toward the plate when each extension tube is aligned with the outlet aperture. Hence, the detent mechanism resists rotation of the flow control member that moves any of the extension tubes out of alignment with the outlet aperture.

Moreover, the cover and the flow control member may be assembled together via an attachment screw. After the remaining components of the sprinkler have been assembled, the deflector flow control member may be rotatably coupled to the cap via the attachment screw. The flow control member and the cap are attached to the cover by an attachment screw. The cap is held in place also by the attachment screw. In summary, the attachment screw holds the cap, the follow control member and the cover together. The flow control member is rotatable about the generally vertical axis to align any of the tubular extensions with the outlet aperture.

SUMMARY OF THE PRESENT INVENTION

Therefore it is a primary object of the present invention to provide an above ground sprinkler that is assembled simply and rapidly without attachment screws. Moreover, the above ground sprinkler of the present invention includes a control member that rotates to allow a nozzle aligned with a horizontal channel.

In order to achieve the above object, an above ground sprinkler of the present invention includes a main body with a housing, a channel controller, an adjustment part, a locking plate, a first cover and a second cover. A driving member for control of rotating and spray directions is mounted in the housing. The driving member includes a transmission gear set driven by water pressure in direction of water flow. Thereby the sprinkler is further driven to rotate by the transmission gear set.

The channel controller is disposed on an upper part of the housing and including a base, a shaft sleeve, a plurality of flow tubes, and a plurality of nozzles. The shaft sleeve is arranged at the center of the base while the flow tubes are formed by radial extension of the shaft sleeve disposed around the base. The nozzle is set on an outlet end of each flow tube around the base. The plurality of nozzles has different spray pattern. The adjustment part is fitted around a lower part of the base.

A tube is projecting from a center on top of the housing. The tube includes a channel whose top is closed. The channel is vertical and bent to form a horizontal channel. The tube is extended upward to form two plates while a retaining groove is formed between the two plates. A rib is disposed on an outer side of each plate. The tube is aligned and mounted into the shaft sleeve of the channel controller and the plates are extended and projecting from the shaft sleeve.

The locking plate includes a rectangular window that is fitted over a column part of the first cover.

The first cover includes the column part with an insertion part while the second cover includes a tongue part. Locking parts are disposed on the insertion part. The insertion part is fitted over the plates while the ribs of the plates are locked with and stopped by the locking parts. When the second cover is covered over the first cover, the tongue part is mounted and locked into the retaining groove so that the two plates are leaning against and locked by the locking parts tightly, unable to be released.

The adjustment part is set between the housing and the base, enclosed and connected to the base. The adjustment part allows users to hold conveniently and rotate the adjustment part. Thus the base is also rotated and the flow tube selected is aligned with the horizontal channel.

No attachment screw is required for assembly of the channel controller with the first cover. The assembly is more convenient and rapid by the ribs and the locking parts locked with each other. The tongue part is used to strengthen tightness of the assembly.

There are at least six nozzles of the channel controller. Each nozzle has at least one hole with different shapes so that the nozzle has different spray pattern.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
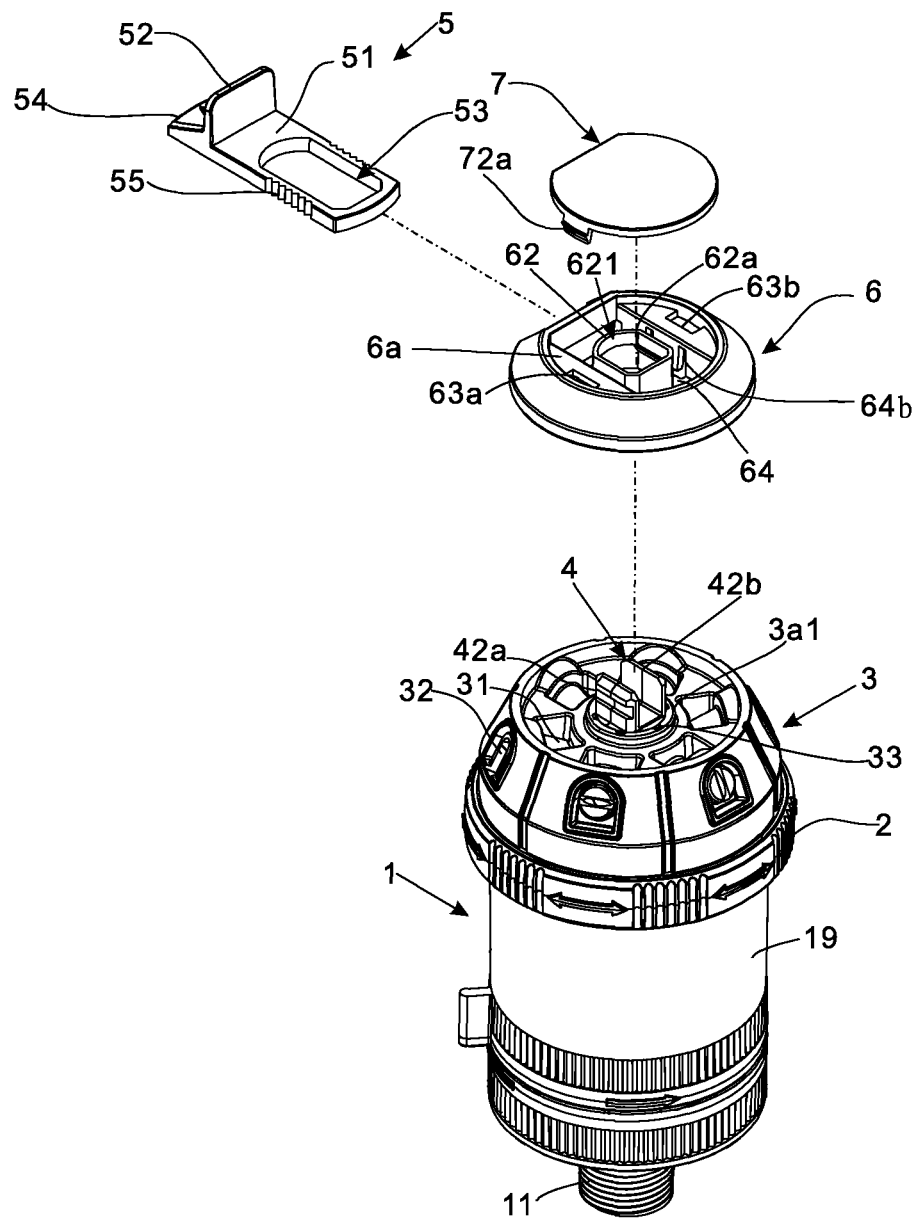
FIG. 1 is a partial explosive view of an embodiment according to the present invention.
Figure 4:
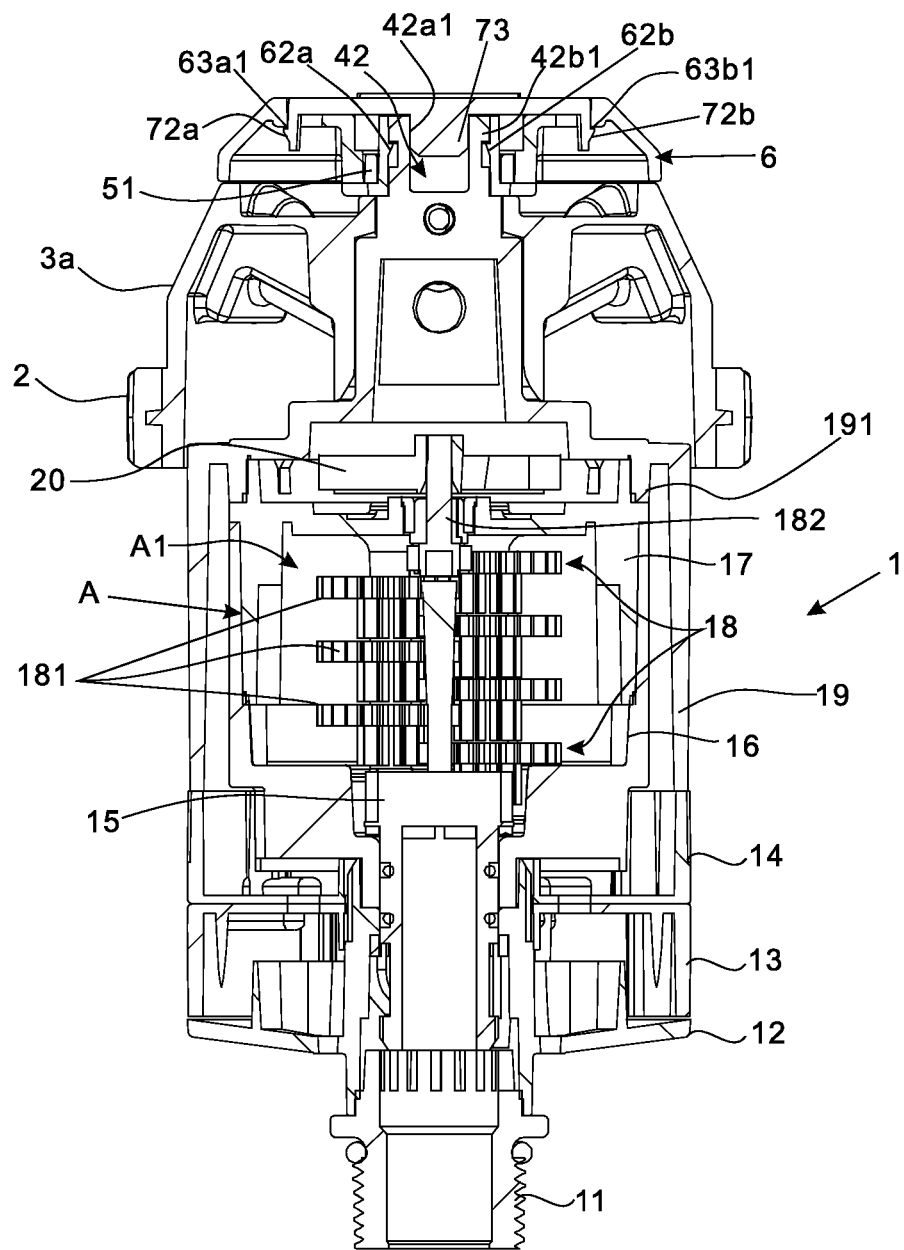
FIG. 4 is a cross sectional view of an embodiment according to the present invention.
Figure 5:
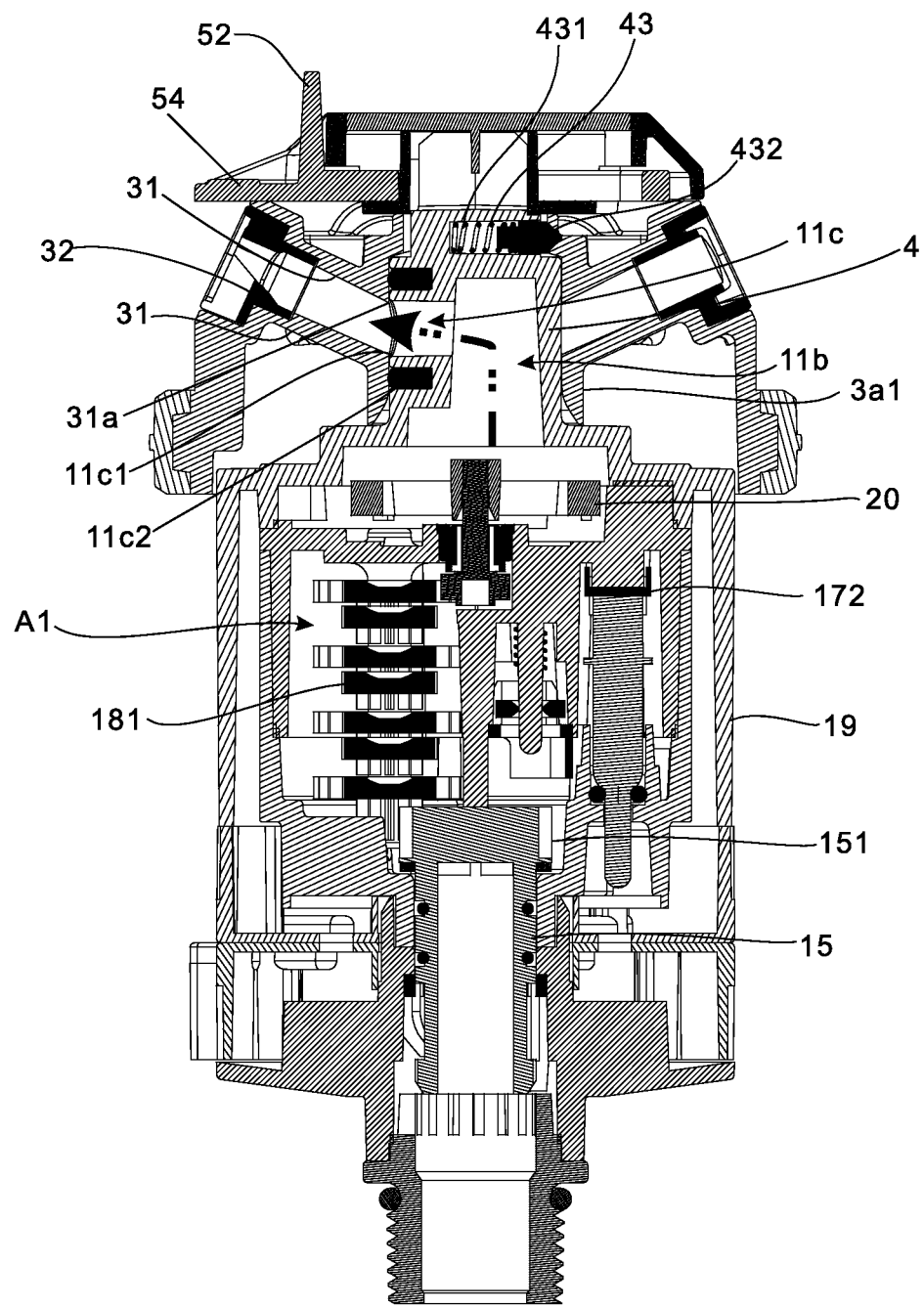
FIG. 5 is another cross sectional view of an embodiment according to the present invention.

Referring to FIG. 1, FIG. 4 and FIG. 5, an above ground sprinkler of the present invention includes a mina body 1, an adjustment part 2, a channel controller 3, a locking plate 5, a first cover 6 and a second cover 7. The main body 1 consists of a connection head 11, a first receiving part 12, a first adjustment ring 13, a second adjustment ring 14, a bearing portion 15, a second receiving part 16, a third receiving part 17, a driving member 18 and a housing 19. The connection head 11 is disposed on a lower end of the first receiving part 12 while a lower end of the bearing 15 is mounted into an axial hole of the first receiving part 12 and an upper end of the bearing part 15 is fitted into an axial hole of the second receiving part 16. A plurality of blades 151 is arranged circularly at a top end of the bearing 15 to form a flow channel. A central shaft on top of the blades 151 is against a bottom end of the third receiving part 17. The first receiving part 12 and the third receiving part 17 are closely connected to each other to form a rotator A with a receiving space A1. The driving member 18 is mounted in the receiving space A1. A top end of the third receiving part 17 is firmly secured to a leaning part 191 of the housing 19. As to the first adjustment ring 13 and the second adjustment ring 14, they are fitted over the first receiving part 12 in turn.

Figure 3:
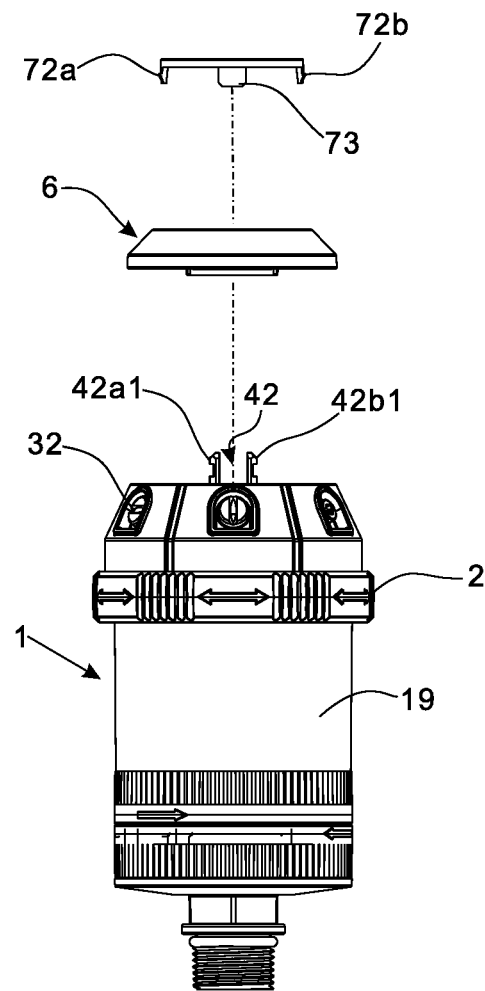
FIG. 3 is a partial side view of an exploded embodiment according to the present invention.

Referring to FIG. 1, FIG. 3 and FIG. 5, a tube 4 is projecting from and integrated with a center on top of the housing 19. The tube 4 includes a channel 11b, a retaining groove 42, and a groove 43. The top of the channel 11b is closed. The channel 11b is extended to form a horizontal channel 11c with an outlet 11c1. A seal ring 11c2 is disposed on the outlet 11c1. Two plates 42a, 42b are formed by the tube 4 extended upward and a retaining groove 42 is formed between the two plates 42a, 42b. A rib 42a1/42b1 is disposed on an outer side of each plate 42a/42b. The groove 43 is radially arranged at the tube 4. A spring 431 and a lock pin 432 are mounted into the groove 43 in turn. The spring 431 elastically pushes against the rear end of the lock pin 432 so that a front end of the lock pin 432 is extended from the groove 43.

Referring to FIG. 1 and FIG. 5, the channel controller 3 is composed of a base 3a, a shaft sleeve 3a1, a plurality of flow tubes 31, a plurality of nozzles 32, and a plurality of stopping parts 33. The shaft sleeve 3a1 is arranged at the center of the base 3a while the flow tubes 31 are disposed radially around the base 3a and formed by extension of the shaft sleeve 3a1. The nozzle 32 is set on a water outlet at the rear end of each flow tube 31. Each of nozzles 32 has different spray pattern. The stopping parts 33 are disposed around the top end of the wall of the shaft sleeve 3a1 and corresponding to the flow tubes 31.

The housing 19 is fitted over the second adjustment ring 14 while the adjustment part 2 is set on a top end of the housing 19, enclosed and connected to the lower part of the base 3a. The tube 4 is aligned and mounted into the shaft sleeve 3a of the channel controller 3 and the plates 42a, 42b are extended and projecting from the shaft sleeve 3a.

Figure 2:
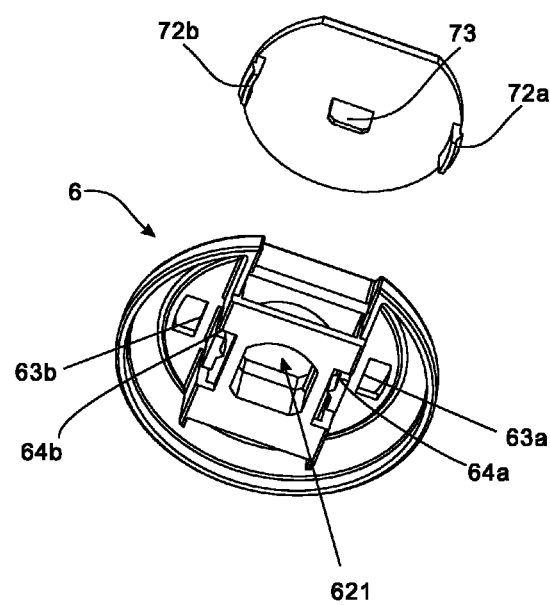
FIG. 2 is a schematic drawing showing a first cover and a second cover viewed at another angle of an embodiment according to the present invention.

Referring to FIG. 1, FIG. 2 and FIG. 4, the first cover 6 is s disc with a concave part 6a on a center of a top side thereof. The concave part 6a is disposed with a column part 62, two indentations 63a, 63b, a mounting slot 64 and two pairs of slots 64a, 64b. The mounting slot 64 is a long slot arranged at a middle part of the first cover 6 while the column part 62 is disposed on the center of the mounting slot 64. The column part 62 includes an insertion part 621 penetrating the first cover 6. Two locking parts 62a, 62b are projecting from the wall surface of the insertion part 621. The insertion part 621 is fitted over the plates 42a, 42b while the ribs 42a1, 42b1 of the plates 42a, 42b are locked with and stopped by the locking parts 62a, 62b. The slots 64a, 64b are vertically arranged at two inner sides of the mounting slot 64 respectively while the indentations 63a, 63b are disposed outside the slots 64a, 64b respectively and penetrating the first cover 6. The second cover 7 is a flat cap whose shape matches the shape of the concave part 6a of the first cover 6. The second cover 7 includes two hook parts 72a, 72b and a tongue part 73. The two hook parts 72a, 72b are set on the circumference of the second cover 7 symmetrically and the tongue part 73 is disposed on a middle part of the bottom surface of the second cover 7. The width of the tongue part 73 is a bit larger than the width of the retaining groove 42 of the tube 4.

A locking plate 5 includes a flat piece 51, a push part 52, a window 53, a stopping part 54 and teeth parts 55. The push part 52 is extended from one end of the locking plate 5 and projecting upward while the stopping part 54 is formed by extension of the push part 52. The flat piece 51 is rectangular and having the window 53 thereof. The rectangular window 53 is fitted over the column part 62 of the first cover 6 and sliding horizontally along the column part 62. The teeth parts 55 are located on two outer sides of the flat piece 51 and are able to be locked a bit into the slots 64a, 64b.

Figure 6:
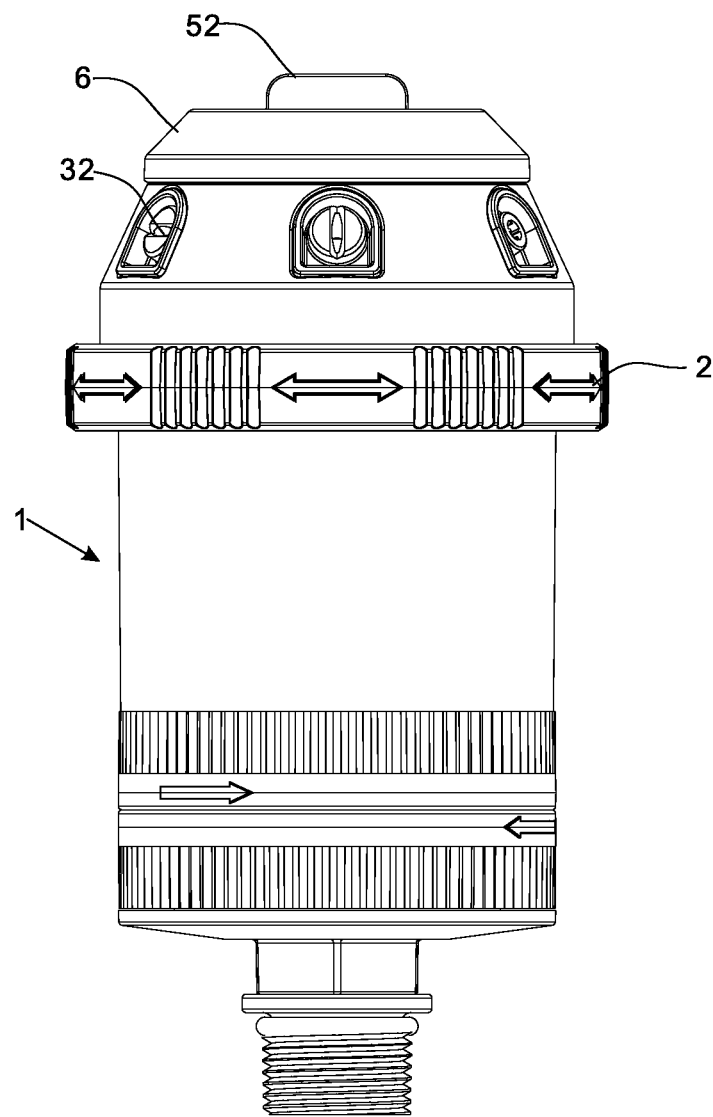
FIG. 6 is an assembled view of an embodiment according to the present invention.

Referring to FIG. 1 and FIG. 3, the tongue part 73 is pressed and mounted into the retaining groove 42 so that the two plates 42a, 42b are leaning against and locked by the locking parts 62a, 62b when the second cover 7 is covered over the concave part 6a of the first cover 6. At the same time, the hook parts 72a, 72b are aligned and locked with bottom edges 63a1, 63b1 of the indentations 63a, 63b to be positioned. Due to the tongue part 73 closely mounted into the retaining groove 42, the plates 42a, 42b are tightly locked by the locking parts 62a, 62b, unable to be released, as shown in FIG. 6.

The channel controller 3 further includes the base 3a that works together with the adjustment part 2. The adjustment part 2 allows users to hold conveniently for rotating the channel controller 3. Thus the base 3a is used for controlling the nozzle 32 to align with the horizontal channel 11c. The base 3a is positioned by the lock pin 432 leaning against the stopping 33 selected. The channel controller 3 further provides a functionality of watering angle adjustment. When the push part 52 of the locking plate 5 is pulled outward and the stopping part 54 is extended, the teeth parts 55 are locked a bit into the slots 64a, 64b for positioning. The projecting stopping part 54 forms a flange of the nozzle 32 and the angle of watering sprayed from the nozzle 32 is lowered. Thereby the water flow is stopped by the stopping part 54 to be sprayed at a lower angle. On the other hand, once the stopping part 54 is turned back by manually operation of the locking plate 5 that pushes the push part 52 inward, the watering from the nozzle 32 will not be stopped or obstructed, being sprayed at the original angle.

Referring to FIG. 4 and FIG. 5, the driving member 18 is mounted in the main body 1 and having a transmission gear set 181, a valve set 172 and an impeller 20. The transmission gear set 181 is formed by a plurality of gears and an output gear. The plurality of gears is connected by a main shaft so that they are driven by one each other and then the output gear is driven to rotate. A support shaft 182 is disposed on a center on top end of the third receiving part 17. The impeller 20 is connected to the support shaft 182 and the valve set 172 is arranged at one side of the third receiving part 17 while the transmission gear set 181 is disposed on the other side of the third receiving part 17, opposite to the side with the valve set 172. The third receiving part 17 is extended and connected to the first receiving part 12. The driving member 18 can also be in other structure formed by techniques available now. The transmission gear set 181 as well as the housing 19 are driven to rotate by water pressure in the direction of water flow.

In addition, the first adjustment ring 13 and the second adjustment ring 14 are fitted over the first receiving part 12 in turn and are able to be rotated manually. Thereby the valve set 172 is opened for adjustment of direction of water flow entering the receiving space A1. The rotating direction of the rotator A is further switched to clockwise direction or counterclockwise direction. The rotating direction of the housing 19 is synchronously driven to change. Thereby the sprinkler can rotate clockwise or counterclockwise.

The water flow is passed through the connection head 11, and entered the bearing part 15. Then the flow is travelling through the flow channel of the bearing part 15 into the receiving space A1 to drive the driving member 18. In the driving member 18, the transmission gear set 181 is rotated due to water pressure of the water flow. Then the water flow is through a central outlet of the impeller 20, the channel 11b, and entered the horizontal channel 11c. By rotating the adjustment part 2, an inlet 31a of the selected flow tube 31 is aligned with an output 11c1 of the horizontal channel 11c so that the water flow is sprayed out through the nozzle 32. The above ground sprinkler of the present invention can be applied to irrigation and having assembly flexibility. Moreover, the above ground sprinkler is easy to use and durable.

In summary, the above ground sprinkler has following features:

1. No attachment screw is required for assembly of the channel controller 3 with the first cover 6. The assembly of the channel controller 3 with the first cover 6 is more convenient and rapid by the ribs 42a1, 42b1 and the locking parts 62a, 62b locked with each other. The tongue part 73 is used to strengthen tightness of the assembly.

2. The tube 4 of the housing 19 provides the channel 11b and works as the shaft at the same time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An above ground sprinkler comprising: a housing capable of being driven to rotate, a connection head disposed on a lower end of the housing as a coupled inlet of a water source, a first receiving part connected to the connection head, a bearing arranged over a first receiving part, a second receiving part set over the bearing, a third receiving part tightly fitted to the second receiving part to form a rotator with a receiving space, a driving member mounted in the receiving space of the rotator, and a first adjustment ring and a second adjustment ring fitted over the first receiving part in turn;

wherein a tube, which is projecting from and integrated with a center on top of the housing, includes a channel, wherein a top of the channel is closed and the channel is extended to form a horizontal channel, wherein two plates are formed by the tube extended upward and a retaining groove is formed between the two plates, wherein a rib is disposed on an outer side of each of the plates and a groove is radially arranged at the tube while a spring and a lock pin are mounted into the groove in turn, wherein the spring elastically pushes against a rear end of the lock pin so that a front end of the lock pin is extended from the groove;

wherein the above ground sprinkler further includes an adjustment part, a locking plate, a first cover, a second cover, and a channel controller disposed on an upper part of the housing, wherein the channel controller includes a base, a shaft sleeve, a plurality of flow tubes, and a plurality of nozzles, wherein the shaft sleeve is projecting from a center of the base while the flow tubes are disposed radially around the base and formed by extension of the shaft sleeve, wherein the nozzle is set on a rear end of the flow tube and having different spray pattern, wherein the adjustment part is fitted around a lower part of the base;

wherein the first cover is a disc with a concave part on a center of a top side thereof and the concave part is disposed with a column part, two indentations, a mounting slot and two pairs of slots, wherein the mounting slot is a long slot set on a middle part of the first cover while the column part is disposed on a center of the mounting slot, wherein the column part includes an insertion part penetrating the first cover and locking parts are projecting from the insertion part, wherein the slots are vertically arranged at two inner sides of the mounting slots respectively while the indentations are disposed outside the slots respectively and penetrating the first cover, wherein the second cover is a flat cap whose shape matches a shape of the concave part of the first cover, wherein the second cover includes two hook parts symmetrically set on a circumference thereof and a tongue part at a middle part of a bottom surface thereof, wherein a width of the tongue part is a bit larger than a width of the retaining groove, wherein the tube is aligned and mounted into the shaft sleeve of the channel controller while the plates of the tube are projecting from the shaft sleeve and the ribs of the plates are locked with the locking parts;

wherein the locking plate includes a fiat piece, a push part extended from one end thereof and projecting upward, a stopping part formed by extension of the push part and a rectangular window fitted over the column part of the first cover and sliding horizontally along the column part, wherein the tongue part is pressed into the retaining groove when the second cover is covered over the concave part of the first cover so that the two plates are leaning against and locked by the locking parts, wherein the hook parts are simultaneously aligned and locked with bottom edges of the indentations to be positioned, wherein the plates are tightly locked by the locking parts due to the tongue part closely mounted into the retaining groove;

wherein the channel controller is rotated by rotation of the adjustment part that allows users to hold conveniently, wherein the nozzle around the base is aligned with the horizontal channel under control of the base of the channel controller.

2. The device as claimed in claim 1, Wherein teeth parts are disposed on two outer sides of the flat piece of the locking plate and are able to be locked into the slots for positioning.

3. The device as claimed in claim 1, Wherein the locking plate is used to adjust spray angle of watering, wherein when the push part is pulled outward and the stopping part is extended, the stopping part forms a flange of the nozzle and an angle of the watering sprayed from the nozzle is lowered, wherein the watering is stopped by the stopping part to be sprayed at a lower angle.

4. An above ground sprinkler, comprising:
a housing having a driving member mounted therein, the driving member being for control of rotating and spray directions and having transmission gears for driving, a tube being projecting from and integrated with a center on top of the housing, the tube including a channel and a top of the channel is closed, the channel being extended to form a horizontal channel, two plates being formed by the tube extended upward and a retaining groove being formed between the two plates, a rib being disposed on an outer side of each of the plates;
a channel controller disposed on an upper part of the housing and having a base, a shaft sleeve, a plurality of flow tubes, and a plurality of nozzles, the shaft sleeve being arranged at a center of the base while the flow tubes are formed by radial extension of the shaft sleeve and disposed around the base, the nozzle being set on an outlet of the flow tube around the base and having different spray pattern, the tube being aligned with and mounted into the shaft sleeve of the channel controller and the plates of the tube being extended and projecting from the shaft sleeve;
an adjustment part fitted around a lower part of the base;
a first cover that includes a column part disposed with an insertion part and locking parts arranged at the insertion part;
a second cover having a tongue part; and
a locking plate that includes a window fitted over the column part of the first cover, wherein the locking plate further includes a fiat piece, a push part extended from one end thereof and projecting upward, and a stopping part formed by extension of the push part, wherein when the push part is pulled outward and the stopping part is extended, the stopping part forms a flange of the nozzle and an angle of the watering sprayed from the nozzle is lowered, wherein the watering is stopped by the stopping part to be sprayed at a lower angle;

wherein the insertion part is fitted over the plates while the ribs of the plates are locked with and stopped by the locking parts, wherein the tongue part is mounted and locked into the retaining groove when the second cover is covered over the first cover, thus the two plates are leaning against and locked by the locking parts tightly and unable to be released;

wherein the base is rotated so that the flow tube selected is aligned with the horizontal channel while the adjustment part is rotated.

5. An above ground sprinkler, comprising:
a housing with a tube projecting from and integrated with a center on top thereof, the tube including a channel and a top of the channel being closed, the channel being extended to form a horizontal channel, two plates being formed by the tube extended upward and a retaining groove being formed between the two plates, a rib being disposed on an outer side of each of the plates;
a channel controller disposed on an upper part of the housing and having a base, a shaft sleeve, a plurality of flow tubes, and a plurality of nozzles, wherein the shaft sleeve is arranged at a center of the base while the flow tubes are formed by radial extension of the shaft sleeve and disposed around the base, wherein the nozzle is set on an outlet of the flow tube around the base and having different spray pattern, wherein the tube is aligned with and mounted into the shaft sleeve of the channel controller and the plates of the tube are extended and projecting from the shaft sleeve;
an adjustment part fitted around a lower part of the base;
a first cover that includes a column part disposed with an insertion part and locking parts arranged at the insertion part;
a second cover having a tongue part; and
a locking plate that includes a window fitted over the column part of the first cover, wherein the locking plate further includes a fiat piece, a push part extended from one end thereof and projecting upward, and a stopping part formed by extension of the push part, wherein when the push part is pulled outward and the stopping part is extended, the stopping part forms a flange of the nozzle and an angle of the watering sprayed from the nozzle is lowered, wherein the watering is stopped by the stopping part to be sprayed at a lower angle;

wherein the insertion part is fitted over the plates while the ribs of the plates are locked with and stopped by the locking parts, wherein the tongue part is mounted and locked into the retaining groove when the second cover is covered over the first cover so that the two plates are leaning against and locked by the locking parts tightly and unable to be released;

wherein the base is rotated so that the flow tube selected is aligned with the horizontal channel while the adjustment part is rotated.

* * * * *